Oct. 13, 1931.  C. D. HARRISON ET AL  1,827,470
REVERSIBLE CHECK VALVE AND CUT-OFF
Filed Jan. 17, 1928  3 Sheets-Sheet 3

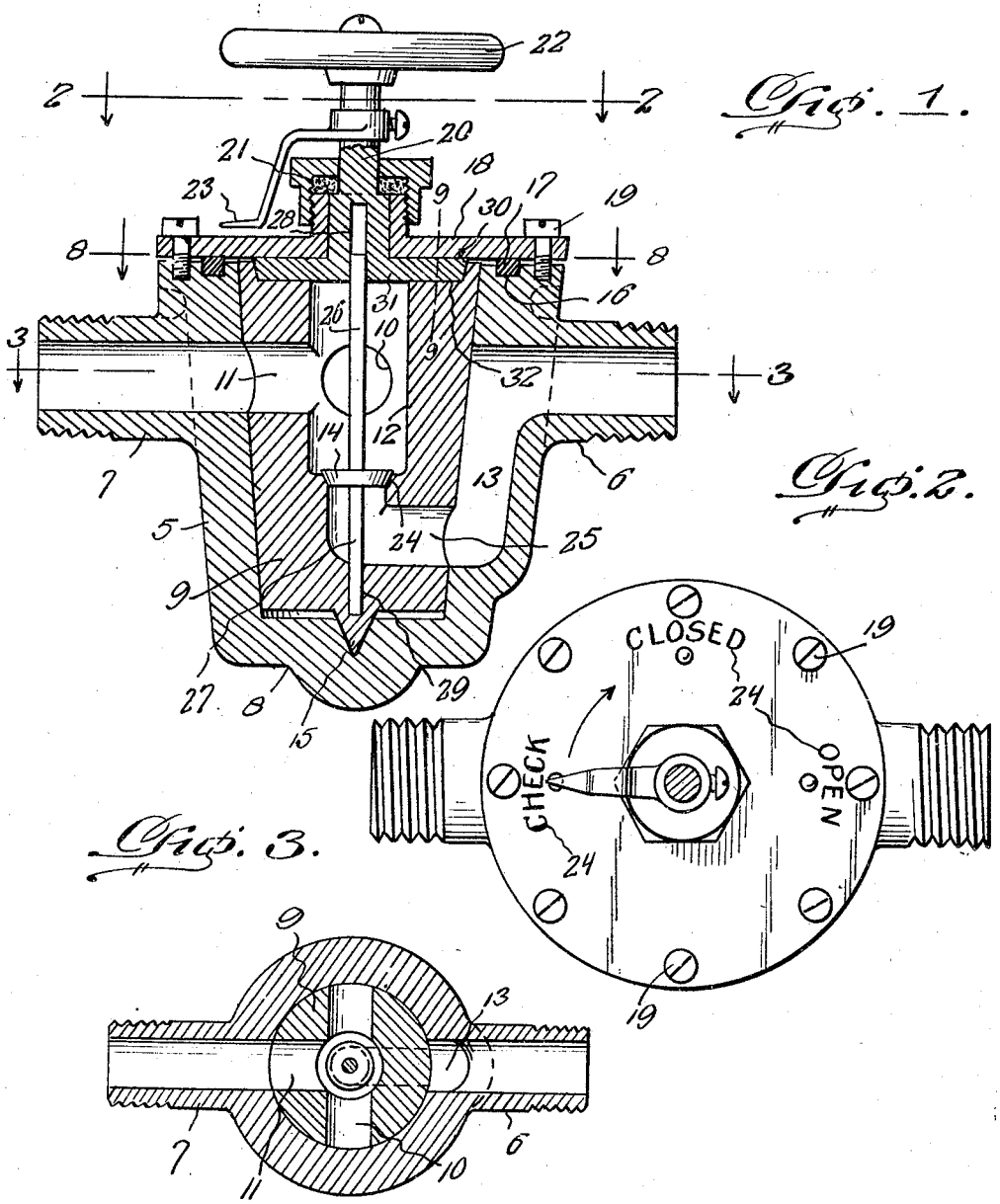

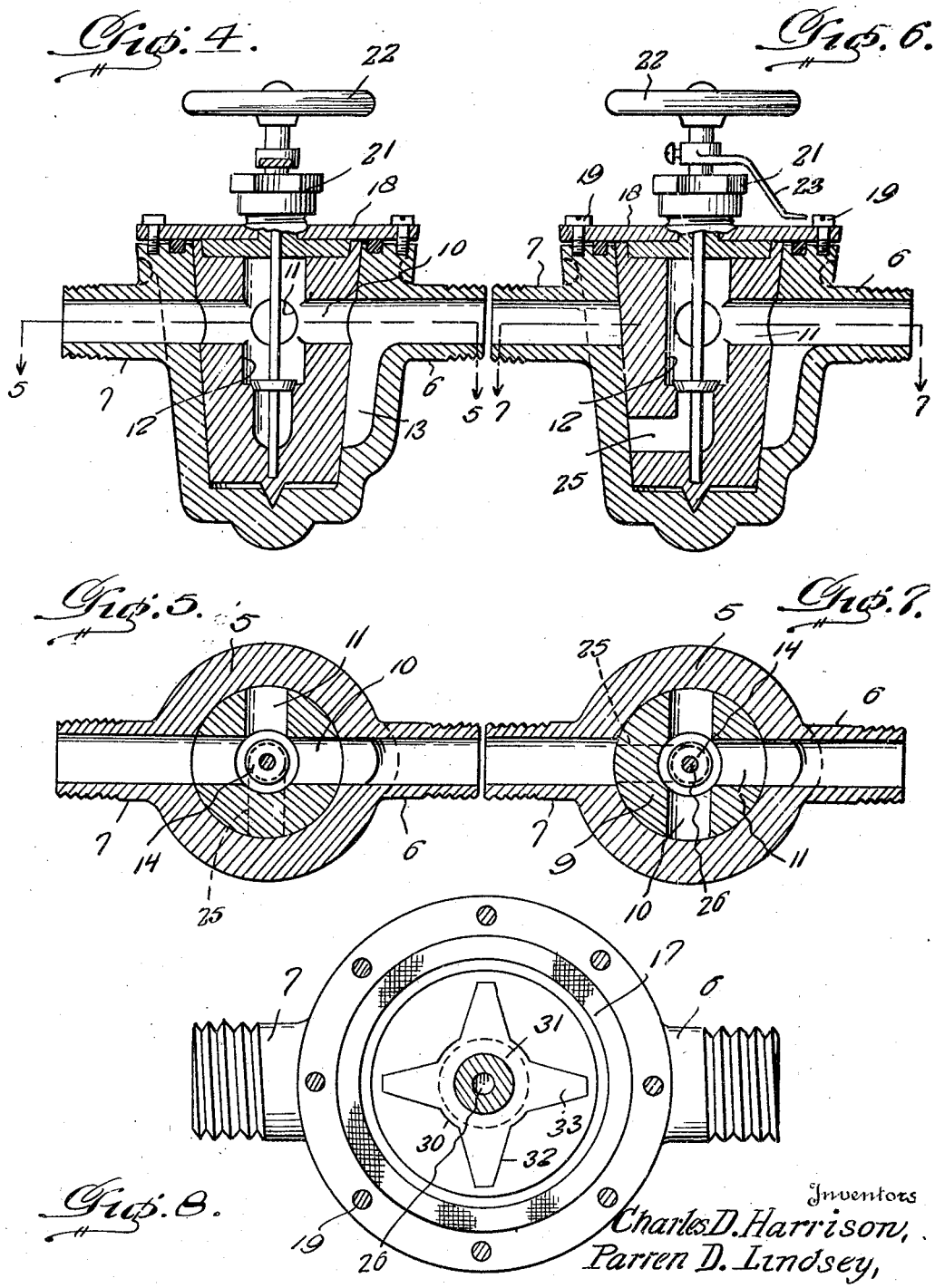

Inventors
Charles D. Harrison,
Parren D. Lindsey,
By J. Stanley Burch
Attorney

Patented Oct. 13, 1931

1,827,470

UNITED STATES PATENT OFFICE

CHARLES D. HARRISON AND PARREN D. LINDSEY, OF HOMINY, OKLAHOMA

REVERSIBLE CHECK VALVE AND CUT-OFF

Application filed January 17, 1928. Serial No. 247,341.

In the control of the flow of liquid, such as the piping of oil and in water distribution, it is very desirable in many cases to control the movement in one direction by a check valve or to cut off the flow entirely.

The primary object of this invention is to provide for both of these conditions by a single valve of simple and practical construction, which is a check valve capable of controlling flow in one direction and also a cut-off valve.

More particularly, the present invention relates to that form of valve in which a turning plug contains a check valve and is capable of being adjusted to permit the flow of liquid through it in one direction while preventing flow in the opposite direction, to permit the free flow in either direction, or to prevent the flow in both directions.

A further object is to make special provision for ready manufacture and effective assembly, as well as ready disassembly for repair or renewal of parts.

The invention consists in the novel form, combination and arrangement of parts hereinafter more fully described, shown in the accompanying drawings and claimed.

In the drawings:—

Figure 1 is a vertical longitudinal section, showing the turn plug adjusted to render the check valve operative and thereby permit flow in one direction and prevent flow in the opposite direction.

Figure 2 is a section on line 2—2 of Figure 1.

Figure 3 is a horizontal section on line 3—3 of Figure 1, drawn on a smaller scale.

Figure 4 is a view similar to Figure 1, but on a smaller scale, showing the turn plug adjusted to permit free flow in either direction.

Figure 5 is a section on line 5—5 of Figure 4.

Figure 6 is a view similar to Figure 4, showing the turn plug adjusted to cut off the flow in both directions.

Figure 7 is a section on line 7—7 of Figure 6.

Figure 8 is a section on line 8—8 of Figure 1.

Figure 10:
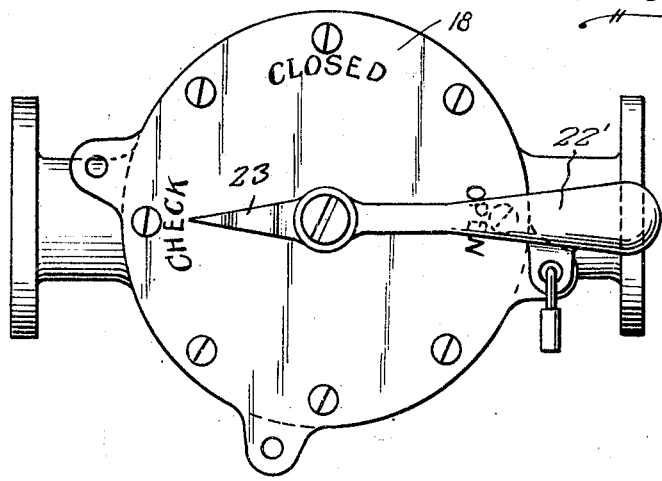
Figure 10 is a top plan view of a modified form of valve.
Figure 9:
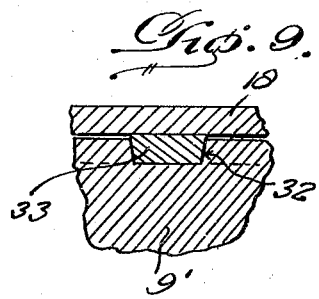
Figure 9 is a fragmentary section on line 9—9 of Figure 1.

In the drawings, 5 represents the casing which is formed with two opposite screw threaded or flanged nipples 6 and 7 for connection with the inlet and outlet pipes. This casing is bored with a tapered hole closed at the bottom by a wall 8 and adapted to receive a tapered turn plug 9, which parts are fitted with a ground joint. The tapered plug is formed with a through or open central transverse passage 10 adapted to place the nipples 6 and 7 in communication with each other when the plug is set in the adjusted position of Figures 4 and 5 so that the fluid may flow freely in either direction. A further radial passage 11 is provided in the turn plug in the same horizontal plane as the nipples 6 and 7 and passage 10, and extends from an axial bore 12 provided in the turn plug to the periphery of the latter at a point midway between the ends of passage 10. As shown, the casing is formed with a vertical internal groove or passage 13 that communicates at its upper end with the inlet nipple 6 and is adapted to be placed in communication with the lower end of the axial bore 12 of the turn plug when the latter is adjusted to the position of Figure 1. A check valve 14 controls the flow through the bore 12 so as to permit flow from the inlet nipple 6 to the outlet nipple 7, but prevent flow in the opposite direction. In view of this construction, it will be apparent that when the turn plug is adjusted so that neither of the passages 10 or 11 are registered with the outlet nipple, as shown in Figures 6 and 7, flow will be cut off in both directions. The axial bore 12 is closed above the passages 10 and 11, and suitable anti-friction bearing means 15 is provided between the bottom wall 8 and the lower end of the turn plug to facilitate turning of the latter. The upper edge of the casing has an annular groove 16 in which is seated a gasket or packing ring 17 that projects above said edge and upon which is clamped a cover plate 18 by means of which the top of the casing is closed with a water-tight joint. The cover plate 18 is preferably secured in place by stud screws 19 passing therethrough and threaded into sockets provided in the upper edge of the casing. A central shaft 20 projects through a central stuffing box 21 of the cover plate and has a suitable operating handle or hand wheel 22 fixed thereon. A pointer 23 is also preferably fixed to turn with the shaft 20 to cooperate with indicia 24 on the upper surface of the cover plate for indicating the position of the turn plug.

In the form of the invention shown in Figures 1 to 9 inclusive, the lower end of the bore 12 forms a seat 24 onto which the valve 14 seats in a downward direction, the lower end of the bore 12 communicating with a smaller passage 25 that leads to the periphery of the turn plug in an opposite direction from that in which the passage 11 extends and in a plane below the latter passage, but coincident with the lower end of passage 13. The valve in this form is of the reciprocating disk or plug type and has upwardly projecting and depending guide stems 26 and 27 vertically slidable in guide pockets 28 and 29, respectively provided in the shaft 20 and turn plug 9. This form of the invention further has the bore 12 opening in tapered form through the upper end of the turn plug, as at 30, and removably seated in this tapered upper end of the bore 12 is a head 31 on the lower end of shaft 20. The upper end of the turn plug 9 also has radial grooves 32 formed therein in which are seated radial arms 33 provided on the head 31. In this way the shaft 20 is keyed to the plug 9 for turning the latter, and its removal permits insertion or removal of the valve 14. The walls of the head 31, grooves 32 and arms 33 are preferably beveled and fitted with a ground joint to prevent leakage when the cover plate is clamped thereon. In this instance, the bearing means 15 consists of a pointed bearing lug on the lower end of the turn plug engaging a tapered socket in the bottom wall 8, and the pointer 23 is separate from the removable hand wheel 22 and fastened on the shaft 20.

Figure 11:
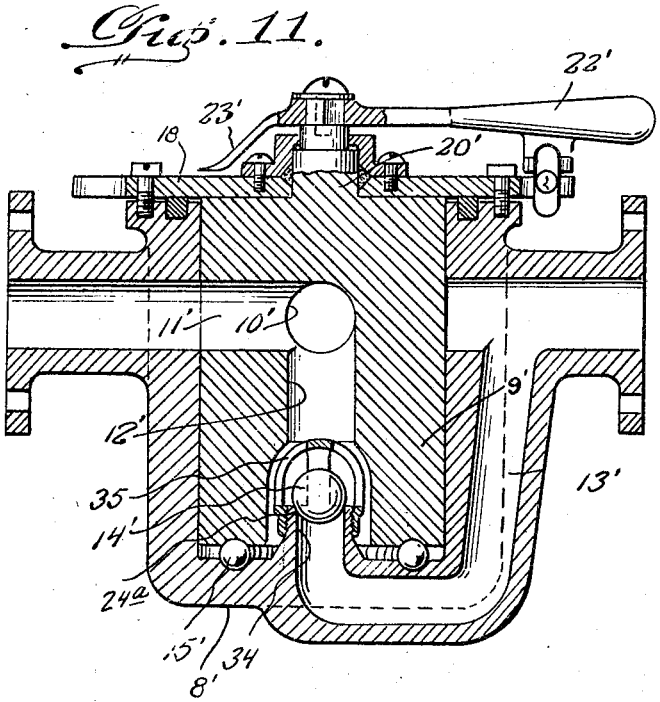
Figure 11 is a vertical longitudinal section of the valve shown in Figure 10, the turn plug being adjusted to permit flow in one direction but prevent flow in the opposite direction.

In the form shown in Figures 10 and 11, the bore 12' opens through the lower end of the turn plug, and the passage 13' opens upwardly through the center of the bottom wall 8' in communication with the bore of a hollow boss 34 provided on the wall 8' and projecting into the lower end of bore 12'. The boss 34 has a seat 24a on which the ball valve 14' seats in a downward direction, and a cage 35 is secured on the boss 34 to prevent undue displacement of the valve 14', although permitting proper unseating of the same. In this instance, the pointer 23' is formed on the hub of handle 22' and the bearing means 15' consists of ball bearings engaging in annular grooves provided in the bottom wall 8' and the lower end of turn plug 9' about the bore 12'. Further, in this form, the bore 12' is closed at the top and the shaft 20' is integrally formed on the top of the turn plug.

Otherwise, the construction of Figures 10 and 11 is similar in all essential respects to that of Figures 1 to 9 inclusive, particularly as to the arrangement of passages 10' and 11' and the manner of adjusting the turn plug for controlling the flow of liquid.

It is thus believed that the construction and operation will be clearly understood without further detailed description.

Minor changes may be made without departing from the spirit and scope of the invention as claimed.

What we claim as new is:—

1. A check valve and cut-off comprising a casing formed with two opposite inlet and outlet ports, a rotary plug fitted in said casing and having an open transverse passage adapted to place said ports in communication with each other to permit flow in either direction when the rotary plug is adjusted to one position, said rotary plug further having an axial bore and a radial passage extending from said bore to the periphery of the rotary plug in the same plane as the casing ports, and midway between the ends of said transverse passage, said casing being formed with a vertical passage which communicates at its upper end with the inlet port, means to place the lower end of said vertical passage in communication with the lower end of the axial bore of the rotary plug when the latter is adjusted to another position with the radial passage registered with the outlet port, and a check valve for controlling the flow through the axial bore of the turn plug.

2. A check valve and cut-off comprising a casing formed with two opposite inlet and outlet ports, a rotary plug fitted in said casing and having an open transverse passage adapted to place said ports in communication with each other to permit flow in either direction when the rotary plug is adjusted to one position, said rotary plug further having an axial bore and a radial passage extending from said bore to the periphery of the rotary plug in the same plane as the casing ports, and midway between the ends of said transverse passage, said casing being formed with a vertical passage which communicates at its upper end with the inlet port, means to place the lower end of said vertical passage in communication with the lower end of the axial bore of the rotary plug when the latter is adjusted to another position with the radial passage registered with the outlet port, a check valve for controlling the flow through the axial bore of the rotary plug, said casing having a bottom wall and provided with an annular groove in its upper edge, a packing ring in said groove, a cover plate clamped on the top of the casing against said packing ring and the top of the rotary plug, and an anti-friction bearing between the lower end of said rotary plug and the bottom wall of the casing.

3. A check valve and cut-off comprising a casing formed with two opposite inlet and outlet ports, a rotary plug fitted in said casing and having an open transverse passage adapted to place said ports in communication with each other to permit flow in either direction when the rotary plug is adjusted to one position, said rotary plug further having an axial bore and a radial passage extending from said bore to the periphery of the rotary plug in the same plane as the casing ports, and midway between the ends of said transverse passage, said casing being formed with a vertical passage which communicates at its upper end with the inlet port, means to place the lower end of said vertical passage in communication with the lower end of the axial bore of the rotary plug when the latter is adjusted to another position with the radial passage registered with the outlet port, a check valve for controlling the flow through the axial bore of the rotary plug, said axial bore opening through the top of the rotary plug, said rotary plug having radial grooves in the top thereof, an operating shaft, a head on the lower end of said shaft and seated in the upper end of said axial bore, radial arms on said head seated in said radial grooves, and a cover plate for the top of the casing clamped against said head.

4. A check valve and cut-off comprising a casing formed with two opposite inlet and outlet ports, a rotary plug fitted in said casing and having an open transverse passage adapted to place said ports in communication with each other to permit flow in either direction when the rotary plug is adjusted to one position, said rotary plug further having an axial bore and a radial passage extending from said bore to the periphery of the rotary plug in the same plane as the casing ports, and midway between the ends of said transverse passage, said casing being formed with a vertical passage which communicates at its upper end with the inlet port, means to place the lower end of said vertical passage in communication with the lower end of the axial bore of the rotary plug when the latter is adjusted to another position with the radial passage registered with the outlet port, a check valve for controlling the flow through the axial bore of the rotary plug, said axial bore opening through the top of the rotary plug, said rotary plug having radial grooves in the top thereof, an operating shaft, a head on the lower end of said shaft and seated in the upper end of said axial bore, radial arms on said head seated in said radial grooves, a cover plate for the top of the casing clamped against said head, said head and arms having beveled ground joints with the walls of said axial bore and radial grooves.

In testimony whereof we affix our signatures.

CHARLES D. HARRISON.
PARREN D. LINDSEY.